No. 617,547. C. S. WILSON. Patented Jan. 10, 1899.
INCUBATOR.
(Application filed Sept. 21, 1897.)
(No Model.) 2 Sheets—Sheet 1.
Fig. I.
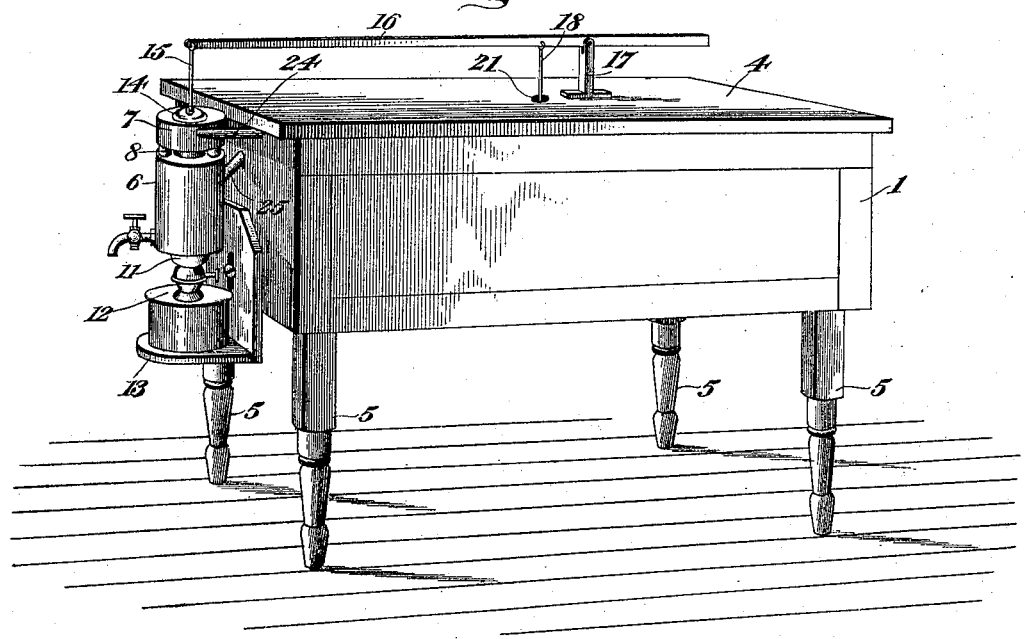
Fig. II.
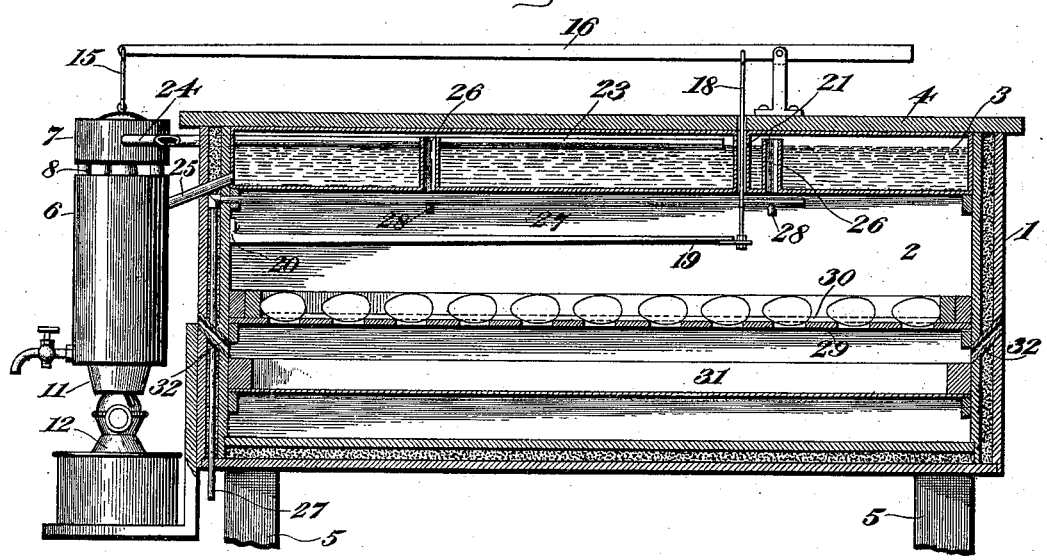
Witnesses
M. E. Fowler
Chester A. Baker
Inventor:
Curtis S. Wilson,
By Joseph L. Atkins
Attorney
THE NORRIS PETERS CO., PHOTO-LITHO., WASHINGTON, D. C.

No. 617,547. Patented Jan. 10, 1899.
C. S. WILSON.
INCUBATOR.
(Application filed Sept. 21, 1897.)
(No Model.) 2 Sheets—Sheet 2.
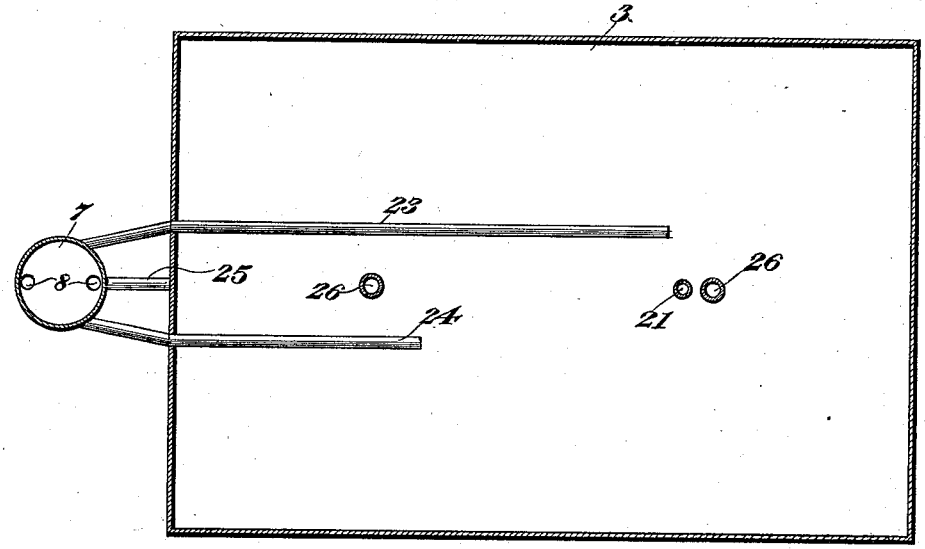
Fig. III.
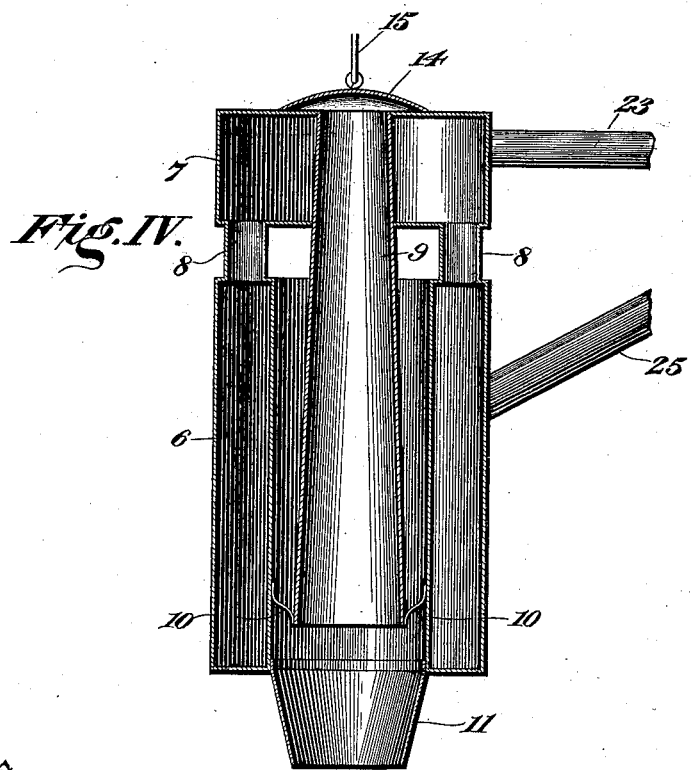
Fig. IV.
Witnesses
M. E. Fowler
Chester A. Baker
Inventor:
Curtis S. Wilson,
By Joseph F. Atkins
Attorney

UNITED STATES PATENT OFFICE.

CURTIS S. WILSON, OF FOREST, OHIO.

INCUBATOR.

SPECIFICATION forming part of Letters Patent No. 617,547, dated January 10, 1899.

Application filed September 21, 1897. Serial No. 652,472. (No model.)

*To all whom it may concern:*

Be it known that I, CURTIS S. WILSON, of Forest, in the county of Hardin and State of Ohio, have invented certain new and useful Improvements in Incubators, of which the following is a complete specification, reference being had to the accompanying drawings.

The objects of my invention are to produce improvements in incubators for promoting an equal distribution of heat throughout the interior of the incubating-compartment, for regulating the degree of heat, and for securing within the compartment a constant supply of fresh air containing the requisite degree of moisture.

With respect to the first-named object of my invention incubators of that class to which my apparatus belongs—namely, such as embody a hot-water heater within the compartment in connection with a lamp exterior thereto—difficulty has been experienced in securing an equal temperature throughout the volume of water employed, the water nearest the source of heat being hotter than that more remote from the source of heat. Efforts have been made to overcome this by dividing the water-compartment by means of partitions, with which the source of heat communicates. Such means, however, have not been completely satisfactory. I propose by my invention to overcome the difficulty by supplying water direct from the source of heat to the interior of the water-compartment at different distances within the water-compartment from the source of heat.

In accomplishing the second object above specified—namely, that of controlling the degree of heat—I employ, in connection with the water-heater, two direct drafts adapted, respectively, to bring the products of combustion into contact with a limited or extensive area of the wall of the heater. By the employment of direct drafts I prevent the production of downward currents from the source of heat, which is usually a lamp, and I thereby obviate the danger of explosion to which downdraft heaters are subjected.

With respect to the third object of my invention above specified I provide for a current of heated vapor from the water-compartment into the interior of the incubating-compartment and arrange the vapor-supply apertures in combination with air-supply pipes, so that the vapor in entering the incubating-compartment draws and commingles with it a supply of fresh air from the outside atmosphere.

In the accompanying drawings, Figure I is a perspective view of a preferred form of my incubator complete. Fig. II is a longitudinal section of the same, partially in elevation, showing the cap depressed upon the heater. Fig. III is a transverse section of Fig. 1, taken through the heating-compartment. Fig. IV is a central vertical section of the heater detached.

Referring to the figures on the drawings, 1 indicates the bottom, side, and end walls of a suitable box or shell, which in practice incloses the incubating-compartment 2 and the water-circulating compartment 3, the latter being preferably defined by an interior metallic case. The walls 1 are preferably double and rendered non-conductive by suitable means—as, for example, a filling of mineral wool.

4 indicates the top of my incubator, and 5 the legs, with which it is preferably provided.

6 indicates a heater, which is preferably a hollow cylindrical structure provided with a similar extension 7, supported by tubes 8, that afford communication between the respective interiors of the heater 6 and its extension 7.

Within the internal air-space of the heater 6 I prefer to provide a smoke-funnel 9, (see Fig. IV,) which, being open from end to end, extends through the extension 7. The funnel 9 is of less diameter than the interior airspace of the heater 6, and its lower extremity may be held in position, as by spacing-pieces 10. The air-space of the heater 6 communicates, as through a dependent hood 11, with a source of heat—for example, a lamp 12, carried upon a vertically-adjustable bracket 13.

The funnel 9 is surmounted by a cap 14, which, as by means of a rod 15, is suspended upon a lever 16, that is carried upon a fulcrum 17, secured to the top 4 of the incubator.

18 indicates a rod that operatively unites the lever 16 with a thermostat 19 at one end, whose opposite extremity is secured to the inside of a wall 1, as indicated at 20. The rod 18 passes through a suitable way 21, provided for it through the cover 4 and the heating-compartment 3. The way through the compartment 3 may be formed as by a tube extending from top to bottom of the compartment and secured thereto at its opposite ends, respectively, by steam-tight joints. The thermostat 19 may be of any suitable or preferred type. That illustrated is shown merely by way of example and consists of a composite rod—that is to say, a rod composed of two metals of different expansibilities under changes of temperature, whereby a bending of the composite rod is induced by change of temperature.

As illustrated, the cap 14 normally closes the end of the funnel 9. In that position the products of combustion from the lamp 12 pass up through the air-space within the heater 6 around the funnel 9 and are brought practically into operative contact with the entire heating medium contained within the heater and its extension 7.

If, through increase in temperature, the thermostat be properly actuated, it will, through the rod 18, elevate the lever 16, which in turn, through the rod 15, lifts the cap from the end of the funnel 9. By this operation the products of combustion pass directly up through the funnel 9 and in so doing will draw away from contact with the interior wall of the heater 6, but make operative contact only with that portion of the heating medium contained within the extension 7. By this arrangement the heating medium within the heater and the extension 7 may be allowed to cool gradually, but without interfering with the combustion from which the heat is derived.

The extension 7 of the heater communicates through a plurality of pipes 23 and 24, for example, which extend into the interior of the heating-compartment 3. Within that compartment they terminate at different distances from the source of heat—namely, the heater 6 or directly from its extension 7.

As many pipes as may be deemed necessary or advisable may be employed in place of the two illustrated.

25 indicates the return-pipe, which establishes communication between the interior of the heater 6 and the heating-compartment 3 and through which the circulation of the heating medium through the compartment, the heater, and its extension is kept up.

Through the employment of pipes of different lengths uniting the heater and the heating-compartment a perfect distribution through the heating-compartment of the heated medium direct from the heater is accomplished, the medium being confined within the pipes until liberated therefrom into the volume of water or other heating medium contained within the heating-compartment.

Upon the floor of the heating-compartment I provide tubular projections 26, whose upper ends in practice extend above the water-level within the compartment 3 and communicate therein with a steam-space in the upper part of the compartment. Steam generated therein passes down through the tubes 26 into the interior of the incubating-compartment 2, and through its own force is diffused throughout the same.

I prefer to utilize the force of steam as a means of ventilation, and therefore employ an air-supply tube 27, which being incased through part of its length within the wall 1, as illustrated in Fig. II, extends within the compartment 2 underneath the floor of the compartment 3 in line with the tubes 26. Underneath each of the tubes 26 the tube 27 is provided with a discharge-aperture 28. By this arrangement the steam passing through each of the tubes 26 is discharged around the end of the aperture 28 and sucks through it fresh air from the outside atmosphere. The air thus supplied is by the steam from the tubes 26 properly heated and moistened before it is disseminated through the compartment 2.

29 and 30 indicate suitable coöperative elements of the egg-tray.

31 indicates a chick-tray.

32 indicates ordinary ventilators, which are adapted to keep the air within the compartment 2 at atmospheric pressure.

What I claim is—

1. In an incubator, the combination with its shell, and hot-water heating-compartment contained therein, of tubular projections extending from the floor of the heating-compartment, an air-supply tube establishing communication between the outside atmosphere and the interior of the shell, there being apertures therein in operative proximity to the tubes in the floor of the heating-compartment, whereby, in operation, the latter, extending into the space within the heating-compartment, supply a heated current of fluid around the apertures of the air-supply tube into the interior of the shell or incubating-compartment, substantially as and for the purpose specified.

2. In an incubator, the combination with a water-circulating compartment and heater communicating therewith, of a plurality of independent alternately-operative passages through the heater for the products of combustion, one of said passages making contact with a limited area of heater-wall, and the other making contact with a more extensive area, and means for rendering the passages alternately operative, substantially as set forth.

3. The combination with an incubator-heater provided with an interior air-space, of an extension supported above the heater by tubes communicating with each, a funnel within the air-space of the heater and passing through the extension thereof, and means for opening and closing the funnel, whereby, when the funnel is closed, the products of combustion pass up by direct draft in contact with the inner walls of the heater, and impinge against the bottom of the extension, and when it is open they pass up through the funnel and make contact only with the extension through the funnel, substantially as set forth.

4. In an incubator, the combination with an incubating-compartment, of a heater operatively connected with said compartment and adapted to promote therein the circulation of a heating medium, a source of heat, a plurality of direct passages for the products of combustion through the heater said passages making contact, respectively, with a limited and extensive area of heater-wall, a cap adapted to alternately open and close the said passages, respectively, a thermostat within the incubating-compartment, and mechanism operatively connecting the thermostat and cap, substantially as set forth.

5. In an incubator, the combination with its shell, and a hot-water heating-compartment therein, of a heater, pipes of different lengths communicating directly with the heater and hot-water compartment, and designed to facilitate the circulation of water through the heater and the water-compartment, and tubes extending upwardly from apertures in the bottom of the compartment to a point above the level of the contained water and designed to convey heated fluid from the interior of the compartment to the interior of the shell or incubating-compartment, substantially as specified.

6. In an incubator, the combination with its shell, and hot-water compartment therein, of a water-heater upon the exterior of the shell, and in communication with the hot-water compartment, tubes extending upwardly from apertures in the bottom of the water-compartment to a point above the normal level of water therein, an air-supply pipe extending from the outside of the shell and below the heating-compartment, in line with the tubes, and provided with apertures in its under side in substantial axial alinement with said tubes, a thermostat arranged within the shell below the air-supply pipe, heat-regulating mechanism operatively connected with the thermostat, and means independent of the supply-pipe above referred to for ventilating the interior of the shell, substantially as specified.

In testimony of all which I have hereunto subscribed my name.

CURTIS S. WILSON.

Witnesses:
J. Q. A. McCLURG,
C. C. TRUMP.